(12) United States Patent
Rosenfeld

(10) Patent No.: US 6,999,726 B2
(45) Date of Patent: Feb. 14, 2006

(54) RADIO STATION AND RADIO SYSTEM

(75) Inventor: Josi Rosenfeld, London (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 447 days.

(21) Appl. No.: 10/219,420

(22) Filed: Aug. 15, 2002

(65) Prior Publication Data

US 2003/0060175 A1    Mar. 27, 2003

(30) Foreign Application Priority Data

Aug. 31, 2001  (GB) .................................. 0121082

(51) Int. Cl.
  *H04B 1/10*   (2006.01)
  *H04B 7/185*  (2006.01)
(52) U.S. Cl. ...................... 455/65; 455/296; 455/303; 455/506; 375/346; 375/349; 342/357.02
(58) Field of Classification Search .................. 455/65, 455/63.1, 67.11, 67.14, 504, 506, 296, 303, 455/304, 273, 275, 276.1, 281; 375/346, 375/349, 150; 342/357.01, 357.02, 357.04, 342/450, 453
See application file for complete search history.

(56) References Cited

U.S. PATENT DOCUMENTS

| 5,095,535 | A  | * | 3/1992  | Freeburg ................. 455/278.1 |
| 5,119,104 | A  | * | 6/1992  | Heller ....................... 342/450 |
| 5,615,232 | A  | * | 3/1997  | Van Nee ..................... 375/346 |
| 5,995,499 | A  | * | 11/1999 | Hottinen et al. ............ 370/337 |
| 6,073,032 | A  | * | 6/2000  | Keskitalo et al. ........... 455/561 |
| 6,417,805 | B1 | * | 7/2002  | Hershey et al. ............. 342/453 |
| 6,541,950 | B1 | * | 4/2003  | Townsend et al. ....... 324/76.14 |
| 6,571,082 | B1 | * | 5/2003  | Rahman et al. .......... 455/67.11 |

OTHER PUBLICATIONS

"Performance Evaluation of the Multipath Estimating Delay Lock Loop", B. Townsend, D.J.R. van Nee, P. Fenton, and K. Van Dierendonck, Proc of the Institute of Navigation National Technical Meeting, Anaheim, California, Jan. 18-20, 1995, pp. 227-283.
"Conquering Multipath, The GPS Accuracy Battle", L.R. Weill, GPS World, Apr. 1997.

* cited by examiner

Primary Examiner—Duc M Nguyen
(74) Attorney, Agent, or Firm—Aaron Waxler

(57) ABSTRACT

A radio system (10) and radio system (1, 2) in which the value of parameters for a model of a received multipath signal transmitted by a remote station (20) are estimated. A sounding signal transmitted and received by the radio station is used to derive data about the reflecting environment and this data is incorporated into the model after scaling it to represent the multipath signal received from a remote station. Optionally or alternatively the remote station may transmit a sounding signal and derive data about its reflecting environment and transmit this data to the radio station, The model may incorporate both sets of derived data, particularly if they are uncorrelated. The values of the resulting parameters are exploited in applications such as ranging, location or equalization.

19 Claims, 5 Drawing Sheets

RADIO STATION AND RADIO SYSTEM

Figure 1:
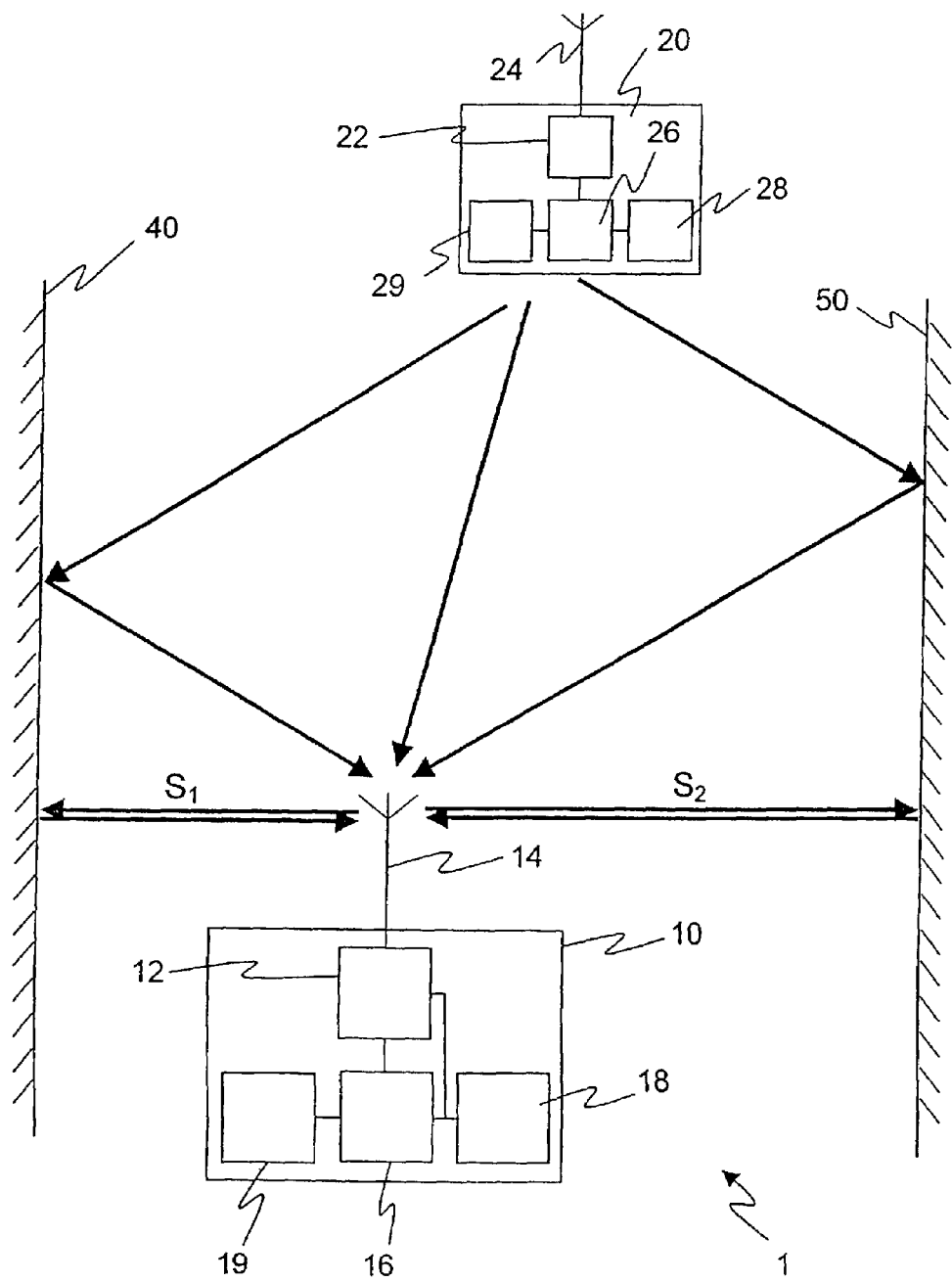

The present invention relates to a radio system and a radio station which may be used in a multipath propagation environment, and has application to, for example, radio systems and radio stations that implement processes that can benefit from information characterising the multipath properties of a radio channel or of a received radio signal. Such processes include ranging, location determination, and equalisation of signals.

In a multipath environment, a radio signal is reflected from reflecting surfaces and is received via more than one propagation path. The various components of the signal received via different paths have different amplitudes, phases and delays, which can make the information extracted from the composite received signal unreliable. For example, if the signal conveys data, the data error rate can be degraded, especially for high bit rate transmission, and if the signal is used for range estimation, the accuracy of the range estimate can be degraded. If the multipath properties of the radio signal can be characterised, the detrimental effects of multipath propagation can be reduced, for example by cancelling out unwanted reflections or by combining the signal received via different paths in a constructive manner. Also there are systems that use multi-element antennas (MEA) to achieve very high bit rate transmission. Such systems employ a characterisation of the multipath properties of the radio signal. An MEA system is described in "Layered Space-Time Architecture for Wireless Communication in a Fading Environment When Using Multi-Element Antennas", G. J. Foschini, Bell Systems Technical Journal, Autumn 1996, pp. 41–59.

One approach to characterising multipath propagation is the use of parameter estimation techniques such as the Multipath Estimating Delay-Lock Loop (MEDLL) (see, for example, "Performance Evaluation of the Multipath Estimating Delay Lock Loop", B. Townsend, D. J. R. van Nee, P. Fenton, and K. Van Dierendonck, Proc of the Institute of Navigation National Technical Meeting, Anaheim, Calif., Jan. 18–20, 1995, pp. 227–283) and the Minimum-Mean-Square-Estimator (MMSE) (see, for example, "Conquering Multipath: The GPS Accuracy Battle", L. R. Weill, GPS World, April 1997). In parameter estimation techniques, the received signal is represented by a mathematical model, for example a model that includes variable parameters representing the amplitude, phase and delay of the signal components received via a plurality of propagation paths, and the parameter values are adjusted iteratively until a good match is obtained between the received signal and the mathematical model. Parameter estimation techniques can result in accurate characterisation of a multipath radio signal, but suffer from the disadvantage of being computationally intensive.

It is an objective of the present invention to provide an improved radio station and radio system for use in a multipath propagation environment.

According to the invention there is provided a radio system comprising a first and a second radio station, the first radio station comprising means for transmitting a first radio signal and the second radio station comprising means for receiving the first radio signal propagated via a direct path and via at least one reflected path, at least one of the first and second radio stations comprising means for transmitting respectively a first and second sounding radio signal, the at least one of the first and second radio stations further comprising means for receiving reflections of respectively the first and second sounding radio signal, means for deriving respectively first and second sounding data from the received reflections of the respective sounding radio signals, the first radio station further comprising means for transmitting any such first sounding data to the second radio station, and the second radio station further comprising means for using at least one of the first and second sounding data to generate a model of the received first radio signal wherein the model comprises at least one parameter, means for estimating the value of the or each parameter and means for exploiting at least one such estimated parameter value.

According to another aspect of the invention there is provided a radio station comprising means for receiving a first radio signal via a direct path and via at least one reflected path, means for using sounding data derived from a sounding radio signal to generate a model of the received first radio signal wherein the model comprises at least one parameter, means for estimating the value of the or each parameter and means for exploiting at least one such estimated parameter value.

The estimation may be performed using parameter estimation techniques. The model of the received first radio signal may be a model of the correlation function resulting from correlating the received first radio signal with a replica of the transmitted first radio signal.

By using information derived from a sounding radio signal about the reflecting surfaces in the environment, the first radio signal may be more accurately characterised and/or characterised with a reduced processing requirement, thereby improving the operation of a radio station or radio system that characterises and exploits the first radio signal. Such exploitation may be, for example, ranging to determine the separation between a radio station transmitting the first radio signal and another radio station receiving the first radio signal, location determination to determine the location of either the first or second radio station, or equalisation to improve the reliability of demodulating information conveyed by the first radio signal.

A sounding radio signal may be transmitted by either or both the first and second radio stations. If the first radio station transmits a sounding radio signal and derives sounding data, this data is transmitted to the second radio station for use in generating the model of the received first radio signal Improvements in characterisation accuracy and/or processing requirement can be made using sounding data derived by both radio stations about the reflecting surfaces in their environment. Both sets of sounding data are combined if the sets of data are dissimilar, indicating different reflecting surfaces in the environment of each radio station, or either one set of sounding data may be used if both sets are similar, indicating that the reflecting surfaces are common to both radio stations. As an example, the similarity of both sets of sounding data may be determined by correlation, with a predetermined degree of correlation being used as a criterion to judge whether to use one or both sets of data. Other criteria may be used to assess similarity.

Parameters in the model of the received first radio signal may include any of the following; distance travelled by this signal via the direct path; angle of arrival (as herein defined) of this signal received via the direct path; amplitude of this signal received via the direct path; amplitude of received reflections. Furthermore, equivalents which are representative of these parameters may be used; for example time of fight is representative of distance travelled at a constant speed.

Any of the values of the parameters of the model of the received first radio signal may be exploited by a radio station. For example, distance travelled may be exploited in a ranging application, distance travelled and angle of arrival may be exploited in a location application, and the amplitude of received reflections may be exploited in an equalisation application.

Figure 2:
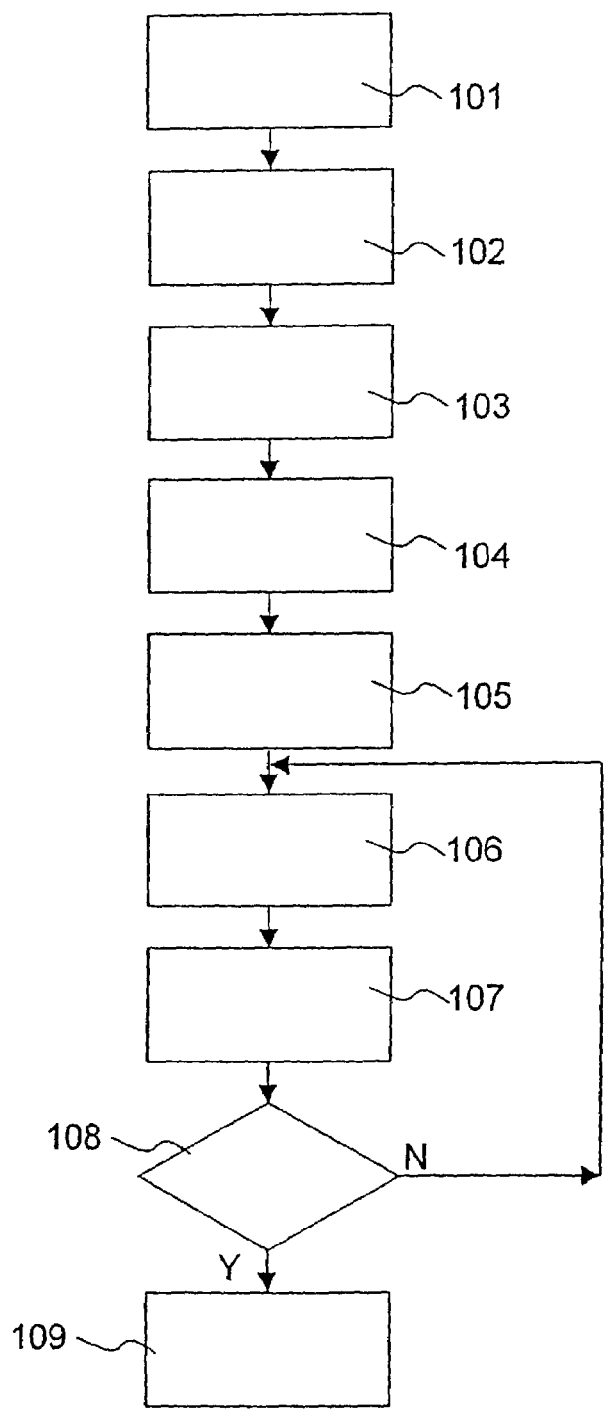
Figure 3:
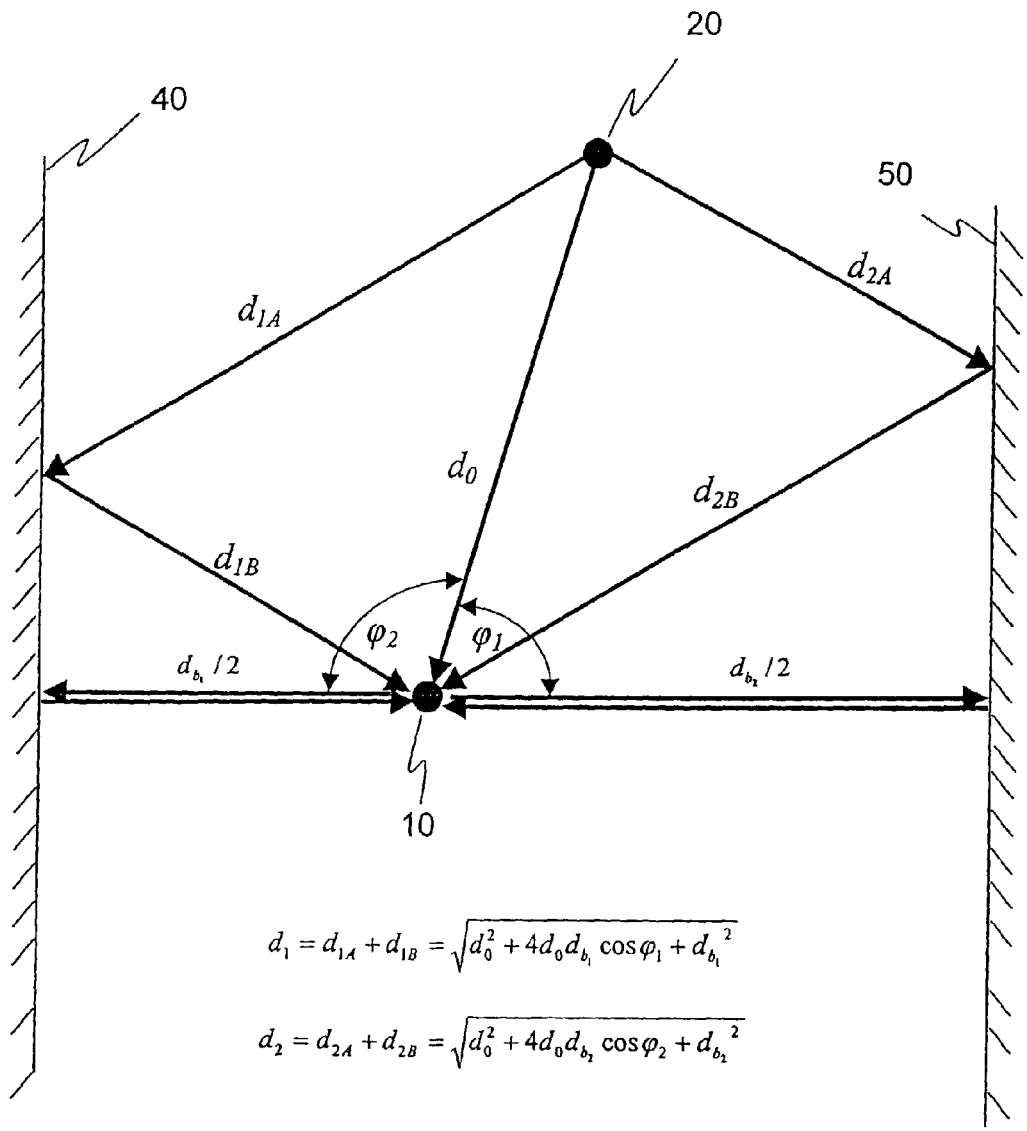
Figure 4:
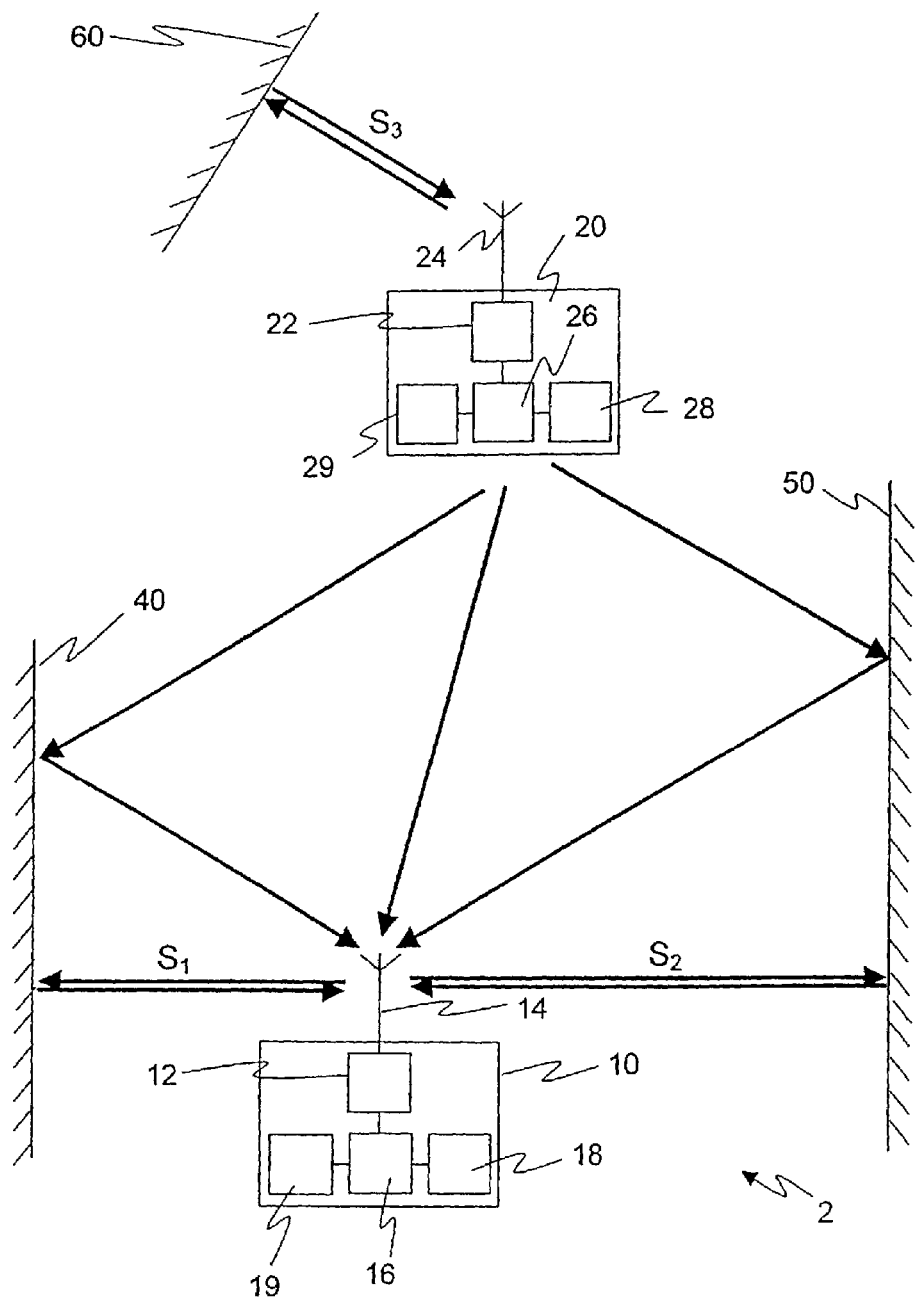
Figure 5:
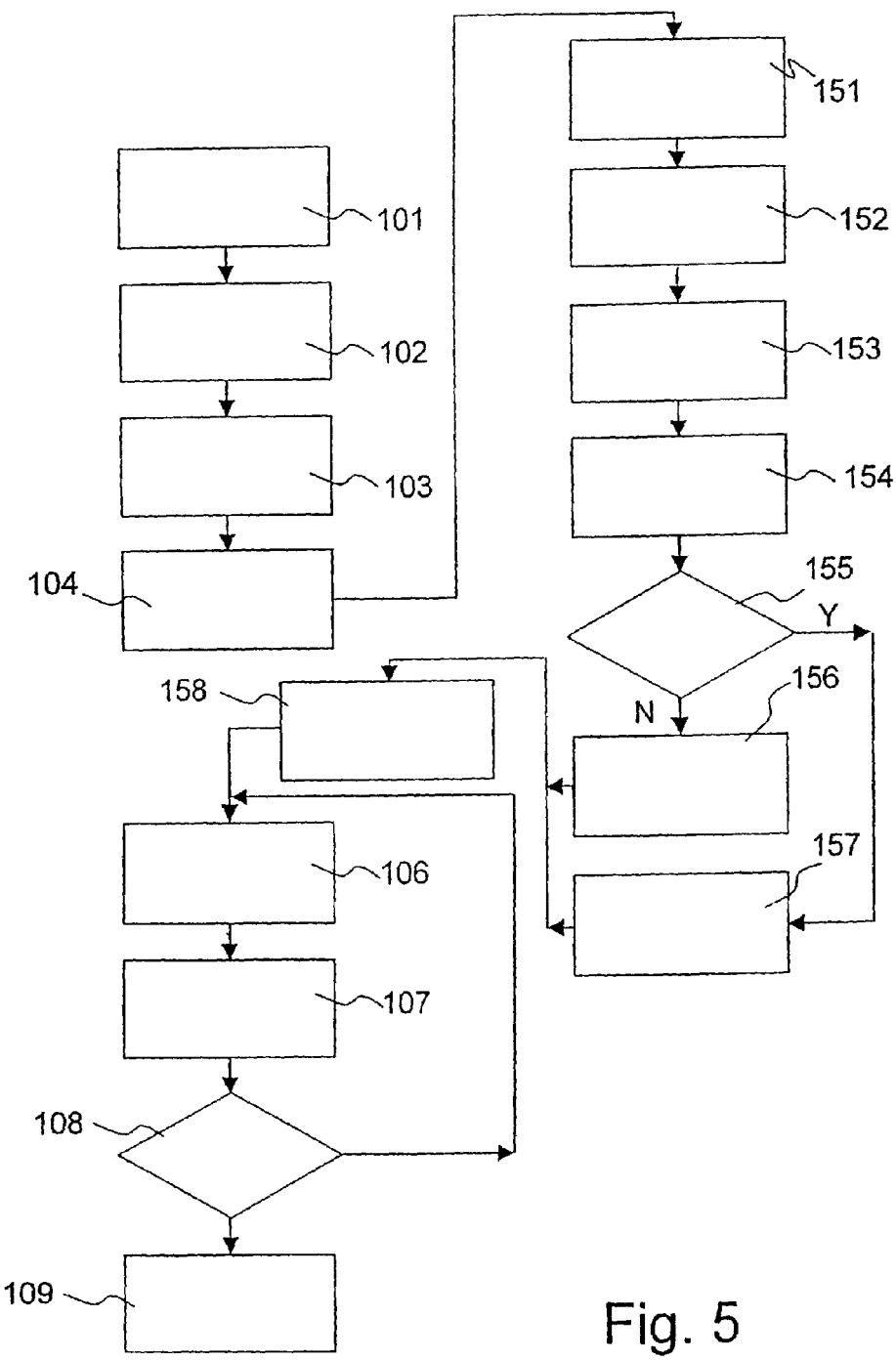

The invention will now be described, by way of example only, with reference to the accompanying drawings wherein:

FIG. 1 is a block schematic diagram of a radio system in a multipath environment, FIG. 2 is a flow chart relating to the operations of a radio station when operating in accordance with an embodiment of the invention, FIG. 3 is a diagram illustrating the geometry of the multipath propagation scenario of FIG. 1, FIG. 4 is a block schematic diagram of another radio system in a multipath environment, and FIG. 5 is a flow chart relating to the operations of a radio station when operating in accordance with another embodiment of the invention, In the drawings the same reference numerals have been used to indicate corresponding features.

The example embodiments of the invention which are described below are radio ranging systems in which a radio station estimates the distance of a target station from which it receives a radio signal. In the example embodiments the first radio signal is referred to as a ranging signal and the first radio station is referred to as the target station. Referring to the radio system 1 of FIG. 1, there is illustrated a radio station 10 comprising a first transceiver 12 coupled to a first antenna 14 and to a first processing means 16. Coupled to the first processing means 16 is a first clock 18 and a first storage means 19. The clock 18 is also coupled to the first transceiver 12. Also in FIG. 1 there is a target station 20 comprising a second transceiver 22 coupled to a second antenna 24 and also coupled to a second processing means 26. Coupled to the second processing means 26 is a second clock 28 and a second storage means 29. The first and second storage means 19, 29 are used by the first and second processing means 16, 26 respectively for temporary storage of data. The first and second clocks 18, 28 are synchronised. Methods of synchronisation are well know and are not described in this specification. Both the radio station 10 and target station 20 are mobile devices. Both transceivers 12, 22 are equipped to communicate using spread spectrum signalling. Also illustrated in FIG. 1 are first and second reflecting surfaces 40, 50 which may be, for example, walls. In a practical scenario there may be more reflecting surfaces but for clarity only two are illustrated in FIG. 1.

Referring to the flow chart of FIG. 2, when the distance of the target station 20 from the radio station 10 is to be measured, operation of the radio station 10 commences at block 101. In block 101 the first processing means 16 initiates the transmission of a sounding signal by the first transceiver 12 and first antenna 14. The sounding signal is reflected off the reflecting surfaces 40, 50 and any other reflecting surfaces in the local environment and is received back at the first transceiver 12 of the radio station 10. The received sounding signal is correlated with a replica of the transmitted sounding signal and the resulting correlation function is sampled K times. The K samples of the received sounding signal correlation function are passed to the first processing means 16. In FIG. 1 the reflection of the sounding signal off the first reflecting surface 40 is denoted $S_1$ and the reflection off the second reflecting surface 50 is denoted $S_2$; other reflections are not illustrated, for clarity.

In block 102 of FIG. 2 the received sounding signal correlation function samples are processed by first processing means 16. The amplitude $a_{b_k}$, k=1, K of each of the K samples is measured and, using the first clock 18 as a time reference, the time delay $\tau_{b_k}$, k=1, K of each sample is measured with respect to the transmitted sounding signal. The first processing means 16 then generates a model of the received sounding signal correlation function $R_b(\tau)$ using the following expression:

$$R_b(\tau) = \sum_{k=1}^{K} a_{b_k} F_b(d_{b_k}/c) \tag{1}$$

where $d_{b_k}=c.\tau_{b_k}$, c is the speed of light, and $F_b(\tau)$ is the ideal correlation function of the sounding signal received via a single path with delay $\tau$ and normalised to have a peak amplitude of unity. This model may be regarded as representing one hypothetical reflecting surface for each of the K samples, each reflecting surface being a distance $d_{b_k}/2$ from the radio station 10. The parameter $d_{b_k}$ is representative, indirectly, of the time delay of the sounding signal.

In block 103 the model of the received sounding signal correlation function is scaled in time and amplitude, by the first processing means 16, to approximate the reflected signal that would be received if the sounding signal had been transmitted from the target station 20. In order to scale in time, each $d_{b_k}$ in equation (1) is replaced by the distance $d_k$ travelled if the signal contributing to that sample had travelled from the target station 20 via the same reflecting surface. Analysis of the multipath geometry illustrated in FIG. 3 shows that the distance $d_k$ travelled by a signal transmitted by the target station 20 and received at the radio station 10 via a $k^{th}$ reflecting surface can be expressed as $$d_k = \sqrt{d_0^2 + d_0 d_{b_k} \cos\phi_k + d_{b_k}^2}, \text{ for } k > 0 \tag{2}$$

where $\phi_k$ is the angle of arrival of the signal received via the direct path and $d_0$ is the direct path distance. The angle of arrival $\phi_k$ is defined as the angle between the direct path and a line perpendicular to the $k^{th}$ reflecting surface, such that the angle is not intersected by the $k^{th}$ reflected path, as shown in FIG. 3.

In order to scale the amplitude, each sample amplitude $a_{b_k}$ is replaced by the amplitude $a_k$ that the sample would have if the signal had travelled from the target station 20 via the same reflecting surface. Using the generally accepted inverse fourth power law for the attenuation with distance travelled, $a_{b_k}$ can be represented as $$a_{b_k} = \frac{B\mu_k}{d_{b_k}^2} \text{ for } k > 0 \tag{3}$$

where B is the amplitude of the transmitted sounding signal and $\mu_k$ is the reflectivity of the reflecting surface, and $a_k$ can be represented as $$a_k = \frac{A\mu_k}{d_k^2} \text{ for } k > 0 \tag{4}$$

where A is the amplitude of transmissions from the target station 20. Combining equations (2), (3) and (4) gives $$a_k = \frac{A a_{b_k} d_{b_k}^2}{B(d_0^2 + d_0 d_{b_k} \cos\varphi_k + d_{b_k}^2)} \text{ for } k > 0 \tag{5}$$

Replacing $d_{b_k}$ in equation (1) by the expression of equation (2), and $a_{b_k}$ in equation (1) by the expression of equation (5) gives the following expression for the scaled model of the received sounding signal correlation function, i.e. a model representing a signal transmitted by the target station 20 and received at the radio station 10:

$$R_{b_{scaled}}(\tau) = \tag{6}$$

$$\sum_{k=1}^{K} \frac{A a_{b_k} d_{b_k}^2}{B(d_0^2 + d_0 d_{b_k} \cos_k + d_{b_k}^2)} F_b\left(\frac{\sqrt{d_0^2 + d_0 d_{b_k} \cos_k + d_{b_k}^2}}{c}\right)$$

$R_{b_{scaled}}(\tau)$ comprises measured data, referred to as sounding data, derived from the received sounding signal and some parameters having unknown values.

In block 104, in response to receiving the sounding signal transmitted by the radio station 10, the target station 20 transmits a ranging signal, and this ranging signal is received by the first transceiver 12 of the radio station 10. The ranging signal is detected at the first transceiver 12 by correlating samples of the received signal with a replica of the transmitted ranging signal. The samples of the received ranging signal correlation function are passed to the first processing means 16.

In block 105 the first processing means 16 generates a model of the correlation function of the received ranging signal comprising a direct path component and the scaled model of the sounding signal correlation function, as follow:

$$R(\tau) = a_0 e^{j\theta_0} F\left(\frac{d_0}{c}\right) + R_{b_{scaled}}(\tau) \tag{7}$$

where $a_0$, $d_0$, and $\theta_0$ are respectively the direct path received amplitude, path length and phase, and F is the ideal correlation function of the ranging signal received via a single path with delay $\tau$ and normalised to have a peak amplitude of unity. The value of $a_0$ may be measured from the samples of the received ranging signal. Parameter estimation techniques such as MEDLL or MMSE referred to above are then used to find values of the parameters $d_0$, $\phi_k$ for k>0, and $\theta_{b_k}$ for k≧0 which result in the model of equation (7) matching the received ranging signal correlation function according to a predetermined criterion. The predetermined criterion can be, for example, a specific maximum acceptable value of the mean-square error between the received ranging signal correlation function and the model, in which case the matching is achieved when the value of the mean-square error is at or less than the maximum acceptable value. As another example, the predetermined criterion can be minimisation of the mean-square error, in which case the matching is achieved when the mean-square error reaches a minimum value. As a further example, the predetermined criterion can be the variation between parameter estimation iterations of a specific parameter value, in which case matching is achieved when the variation is below a target value.

In block 106 the first processing means 16 generates an enhanced model of the received ranging signal correlation function which incorporates, via R(τ), the values of the parameters $d_0$, $\phi_k$, and $\theta_{b_k}$ generated at block 105. The enhanced model is:

$$R_{enh}(\tau) = R(\tau) + \sum_{m=1}^{M} a_m F(d_m/c) e^{j\theta_m} \tag{8}$$

The summation of factors over m=1, M represent the correlation functions of additional, specular reflections that are not present in the reflections of the sounding signal. These factors are added progressively to the model at block 106, after each addition a parameter estimation process being performed at block 107 to generate an enhanced value for the parameters $d_0$, $\phi_k$, $\theta_{b_k}$, $a_m$, $d_m$, and $\theta_m$. At block 108 the match between the received ranging signal correlation function and the model is evaluated and if the predetermined criterion has not been achieved flow reverts to block 106 where a further specular reflection is added to the enhanced model.

When the predetermined target value of the means-square error has been reached flow passes to block 109 where one or more of the resulting parameter values are exploited. In the present example embodiment for a ranging system, exploitation comprises displaying, or storing for subsequent processing, the value of the parameter $d_0$ which represents the distance of the target station 20 from the radio station 10. For example, the radio station 10 may be a portable device carried by a user and providing the user with an estimate of the range of a second portable device comprising the target station 20. As another example, the radio station 10 may be a portable device carried by a user and functioning as a proximity detector, providing an alert whenever a target station 20 moves beyond, or alternatively within, a prescribed range. Such an application could warn of a child roaming away from a parent, or an object being illegally removed from a building.

Referring to the radio system 2 of FIG. 4, there is illustrated a further embodiment of the invention, also for a radio ranging system. The same reference numerals have been used to identify elements that are identical with elements of FIG. 1. Only the differences from FIG. 1 will be described. In FIG. 4 there is illustrated a third reflecting surface 60 and the reflection off this surface of a signal transmitted by the target station 20' is denoted $S_3$.

FIG. 5 is a flow chart for the further embodiment illustrated in FIG. 4. Identically numbered blocks in FIG. 5 and 2 have identical operations. The flow chart commences at block 101 with flow proceeding with blocks 102, 103 and 104 identically to FIG. 5. From block 104 flow proceeds to the additional blocks 151 to 158 inclusive which are described below, and then reverts to blocks 106 to 109.

In block 151 the target station 20 receives reflections of the ranging signal that it transmitted, detecting the ranging signal in the second transceiver 22 by correlating samples of the received signal with samples of a replica of the transmitted ranging signal. In FIG. 4 a single reflection $S_3$ from reflecting surface 60 is illustrated being received at the target station 20; other reflections received by the target station 20 are not illustrated for clarity. In this way the ranging signal performs an equivalent function for the target station 20 as the sounding signal performs for the radio station 10, that is, the ranging signal is also a sound signal. K' samples of the correlation function of the received ranging signal are passed to the second processing means 26.

In block 152 the received ranging signal correlation function samples are processed by the second processing means 26. The amplitude $a'_{b_k}$ and delay $\tau'_{b_k}$ with respect to the transmitted ranging signal, k=1, K' of each of the K' samples is measured. The second processing means 26 then generates a model of the correlation function of the received ranging signal $R_b'(t)$ using the following expression:

$$R_b'(\tau) = \sum_{k=1}^{K'} a'_{b_k} F(d'_{b_k}/c) \qquad (9)$$

Where $d'_{b_k} = c.\tau'_{b_k}$. This model may be regarded as representing one hypothetical reflecting surface for each of the K' samples, each reflecting surface being a distance $d'_{b_k}/2$ from the target station 20. The parameter $d'_{b_k}$ is representative, indirectly, of the time delay of the ranging signal signal received back at the target station 20.

In block 153 the model of the received ranging signal correlation function is scaled in time and amplitude to approximate the correlation function of the reflected signal that would be received if the ranging signal had been transmitted from the radio station 10. In order to scale in time, each $d'_{b_k}$ in equation (9) is replaced by the distance $d'_k$ travelled if the signal contributing to that sample had travelled from the radio station 10 via the same reflecting surface. Analysis for the target station 20 of a multipath geometry equivalent to that illustrated in FIG. 3 shows that the distance $d'_k$ travelled by a hypothetical signal transmitted by the radio station 10 and received at the target station 20 via a $k^{th}$ reflecting surface can be expressed as $$d'_k = \sqrt{d'_0{}^2 + d'_0 d'_{b_k} \cos\phi'_k + d'_{b_k}{}^2}, \text{ for } k>0 \qquad (10)$$

where $\phi'_k$ is the angle of arrival of the signal received via the direct path and $d'_0$ is the direct path distance.

In order to scale the amplitude, each sample amplitude $a'_{b_k}$ is replaced by the amplitude $a'_k$ that the sample would have if the signal had travelled from the radio station 10 via the same reflecting surface. Using the generally accepted inverse fourth power law for the attenuation with distance travelled, $a'_{b_k}$ can be represented as $$a'_{b_k} = \frac{A\mu_k}{d'_{b_k}{}^2} \text{ for } k > 0 \qquad (11)$$

where A is the amplitude of the transmitted ranging signal and $a'_k$ can be represented as $$a'_k = \frac{B\mu_k}{d'_k{}^2} \text{ for } k > 0 \qquad (12)$$

where B is the amplitude of transmissions from the radio station 10. Combining equations (10), (11) and (12) gives $$a'_k = \frac{B a'_{b_k} d'_{b_k}{}^2}{A(d'_0{}^2 + d'_0 d'_{b_k} \cos\varphi'_k + d'_{b_k}{}^2)} \text{ for } k > 0 \qquad (13)$$

Replacing $d'_{b_k}$ in equation (9) by the expression of equation (10), and $a'_{b_k}$ in equation (9) by the expression of equation (13) gives the following expression for the scaled model of the correlation function of the ranging signal received by the target station 20, i.e. a model representing a signal transmitted by the radio station 10 and received at the target station 20:

$$R'_{b_{scaled}}(\tau) = \qquad (14)$$

$$\sum_{k=l}^{K'} \frac{B a'_{b_k} d'_{b_k}{}^2}{A(d'_0{}^2 + d'_0 d'_{b_k} \cos'_k + d'_{b_k}{}^2)} F'\left(\frac{\sqrt{d'_0{}^2 + d'_0 d'_{b_k} \cos'_k + d'_{b_k}{}^2}}{c}\right)$$

$R'_{b_{scaled}}(\tau)$ comprises measured data derived from the received ranging signal and some parameters having unknown values. The measured data is termed sounding data.

Due to reciprocity, the model of equation (14) also represents a signal transmitted by the target station 20 and received at the radio station 10. The difference between the model of equation (6) and the model of equation (14) is the different reflecting surfaces contributing to the reflections. Reflecting surfaces 40 and 50 local to the radio station 10 contribute to the model of equation (6), and reflecting surface 60 local to the target station 20 contributes to the model of equation (14).

In block 154 sounding data for the model of equation (14) is transmitted by the target station 20 and received by the radio station 10 where it is passed to the first processing means 16.

In block 155 a comparison is made in the first processing means between the sounding data for the scaled model of the sounding signal correlation function received at the radio station 10, as defined by equation (6), and the sounding data for the scaled model $R'_{b_{scaled}}(\tau)$ of the correlation function of the ranging signal (functioning as a sounding signal) received at the target station 20, as defined by equation (14), to assess the similarity of the sounding data. This similarity may be assessed by correlation of the data. If the comparison indicates that the sounding data for the two scaled models are dissimilar, with respect to a predetermined criterion, flow transfers to block 156 of FIG. 5. If the comparison indicates that the sounding data for the two scaled models are similar, with respect to a predetermined criterion, flow transfers to block 157 of FIG. 5. The former case can arise if the same reflecting surfaces contribute to both models, and the latter case can arise if different reflecting surfaces contribute to both models. In both block 156 and 157 the first processing means 16 generates a model of the ranging signal received at the radio station 10. In block 156 this model comprises a direct path component and both scaled models $R_{b_{scaled}}(\tau)$ and $R'_{b_{scaled}}(\tau)$ as follows:

$$R(\tau) = a_0 F(d_0/c) e^{j\theta_0} + R_{b_{scaled}}(\tau) + R'_{b_{scaled}}(\tau) \qquad (15)$$

In block 157 this model for R(t) comprises a direct path component and only one of the scaled models, $R_{b_{scaled}}(\tau)$ as in equation (7), or $R'_{b_{scaled}}(\tau)$, this being equivalent if the two scaled models are correlated. From both blocks 156 and 157 flow proceeds with block 158 in which parameter estimation techniques such as MEDLL or MMSE are applied to the model R(t), being either equation (7) or (15), to find values of the parameters that cannot be measured. The parameter estimation accuracy is selected such that the model matches the received ranging signal correlation function according to a predetermined criterion. One way that the degree of match can be assessed is to measure the mean-square error between the model and the received ranging signal correlation function, in which case the predetermined criterion may be a predetermined mean-square error magnitude, or a predetermined maximum variation of mean-square error between parameter estimation iterations. An alternative way of measuring the degree of match is to measure for consecutive parameter estimation iterations the variation in the value of a parameter, terminating the estimation when the variation is below a predetermined value. The skilled reader will readily devise alternative criteria for assessing the parameter estimation accuracy.

Flow proceeds from block 158 to block 106 and continues identically to the embodiment described with reference to FIG. 2.

In the embodiments described the sounding signal is transmitted before the ranging signal. However, in general, either signal may be transmitted first.

In the embodiment of FIGS. 4 and 5, the ranging signal, having been transmitted by the target station 20, is received and processed by the target station 20 as a sounding signal, in addition to being received and processed by the radio station 10. However, in general, separate ranging and sounding signals may be transmitted by the target station 20, these separate signals being transmitted in either order.

Optionally, parameter estimation may be applied to the scaled model $R_{b_{scaled}}(\tau)$ of the correlation function of the sounding signal received back at the radio station 10 to generate initial estimates for the parameters having unknown values. These initial estimates can then be used in the model $R(\tau)$ of the received ranging signal correlation function. Similarly, parameter estimation can be applied to $R'_{b_{scaled}}(\tau)$ to generate initial estimates of parameter values.

Other models of $R_b(\tau)$ and $R'_b(\tau)$ than those presented in the specific embodiments may be used. For example, the model may disregard the phase of signal components of the received signal and model only the envelope. Such a model could take the following form:

$$R_b(\tau) = \left| \sum_{k=1}^{K} a_{b_k} F(d_{b_k}/c) \right|. \qquad (16)$$

Optionally one or more values of the angle of arrival $\phi_k$ may be exploited; in conjunction with $d_0$ the angle of arrival provides sufficient information for the location of the target station 20 to be calculated relative to the radio station 10 and each reflecting surface 40, 50 in two dimensions. For example, in a building the reflecting surfaces 40, 50 may be walls and the location of a device comprising the target station 20 may be calculated relative to the walls and the location of a portable device carried by a user comprising the radio station 10.

Optionally, prior to generating the model of the correlation function of the sounding signal $R_b(\tau)$ received at the radio station 10, or the correlation function of the ranging signal $R'_b(\tau)$ received at the target station 20, the corresponding signal may be examined to assess whether its amplitude decay is approximately inversely proportional to delay $\tau$. This assessment may be performed, for example, by curve fitting. Such a decay is indicative of a large number of randomly positioned reflectors. If the decay is approximately inversely proportional to time, a simplified model may be used in which the reflected signal paths are represented by an expression of the form $\beta/\tau$, i.e.

$$R_b(\tau) = \frac{\beta}{\tau} \text{ and/or } R'(\tau) = \frac{\beta'}{\tau}$$

where $\beta$ and $\beta'$ are free parameters in the estimation process.

Typically, the ranging signal and the sounding signal may be spread spectrum signals, but other signalling schemes can be used.

Optionally other methods of initiating transmission of the ranging signal from the target station 20 may be used. For example, transmission of the ranging signal may be initiated by transmission from the radio station 10 of a signal other than the sounding signal. As another example, the target station 20 may initiate transmission of a ranging signal periodically.

Another example of exploiting at least one parameter value resulting from the parameter estimation process is the use of such values in equalisation of a multipath signal. The amplitude $a_k$ and delay $\tau_k$ (or equivalently distance travelled $d_k$) of the multipath components of the first radio signal can be characterised by means of equations (2) and (3) and by the values of the parameters $\theta_{b_k}$. The characterised components can be combined coherently to produce a composite signal that can be demodulated with increased reliability, or components can be removed to enable the remaining component or components to be demodulated with reduced interference from the removed components.

Optionally the comparison of block 155 in FIG. 5 may be omitted, in which case the operation of block 157 is also omitted, and flow proceeds from block 154 to block 156 in which the model comprises a direct path component and both scaled models $R_{b_{scaled}}(\tau)$ and $R'_{b_{scaled}}(\tau)$ regardless of whether the data for $R_{b_{scaled}}(\tau)$ and $R'_{b_{scaled}}(\tau)$ are similar. This option may be used, for example, for embodiments where it is known a priori that the radio station 10 and the target station 20 have different reflecting environments, but may also be used where the reflecting environments are similar.

Optionally sounding data may be derived at only the target radio station 20 and transmitted to the radio station 10 for use in generating the model of the correlation function of the received ranging signal. In this case $R_{b_{scaled}}(\tau)$ is omitted from equation (15). This option may be used, for example, for embodiments where it is know a priori that the radio station 10 and the target station 20 have similar reflecting environments.

What is claimed is:

1. A radio system comprising a first and a second radio station, the first radio station comprising means for transmitting a first radio signal and the second radio station comprising means for receiving the first radio signal propagated via a direct path and via at least one reflected path, at least one of the first and second radio stations comprising means for transmitting respectively a first and second sounding radio signal, the at least one of the first and second radio stations further comprising means for receiving reflections of respectively the first and second sounding radio signal, means for deriving respectively first and second sounding data from the received reflections of the respective sounding radio signals, the first radio station further comprising means for transmitting any such first sounding data to the second radio station, and the second radio station further comprising means for using at least one of the first and second sounding data to generate a model of the received first radio signal wherein the model comprises at least one parameter, means for estimating the value of the or each parameter and means for exploiting at least one such estimated parameter value.

2. A radio system as claimed in claim 1, the second radio station further comprising means for comparing the first and second sounding data and means for using both of the first and second sounding data to generate the model of the received first radio signal if the first and second sounding data are dissimilar according to a predetermined criterion and otherwise using one of the first and second sounding data to generate the model.

3. A radio system as claimed in claim 1, or a radio station, wherein the model comprises a parameter representative of a distance travelled by the first radio signal received via the direct path.

4. A radio system as claimed in claim 1, or a radio station, wherein the model comprises a parameter representative of a received amplitude of the first radio signal received via the direct path.

5. A radio system as claimed in claim 1, or a radio station, wherein the model comprises a parameter representative of an angle of arrival of the first radio signal received via the direct path.

6. A radio system as claimed in claim 1 or a radio station, wherein one such exploited parameter value is representative of the distance travelled by the first radio signal received via the direct path.

7. A radio system as claimed in claim 1 or a radio station, wherein one such exploited parameter value is representative of the received amplitude of the first radio signal received via the direct path.

8. A radio system as claimed in claim 1 or a radio station, wherein one such exploited parameter value is representative of the angle of arrival of the first radio signal received via the direct path.

9. A radio system as claimed in claim 1 or a radio station, wherein the exploiting comprises ascertaining a location of a radio station.

10. A radio system as claimed in claim 1 or a radio station, wherein the exploiting comprises range determination.

11. A radio system as claimed in claim 1 or a radio station, wherein the exploiting comprises equalisation of a received radio signal.

12. A radio station comprising means for receiving a first radio signal via a direct path and via at least one reflected path, means for using sounding data derived from a sounding radio signal to generate a model of the received first radio signal wherein the model comprises at least one parameter, means for estimating the value of the or each parameter and means for exploiting at least one such estimated parameter value, wherein the radio station further comprises means for receiving first sounding data from the source of the first radio signal, means for transmitting a second sounding radio signal, means for receiving reflections of the second sounding radio signal, means for deriving second sounding data from the received reflections of the second sounding radio signal, and means for using at least one of the first and second sounding data to generate the model of the received first radio signal.

13. A radio station as claimed in claim 12, comprising means for receiving the sounding data from the source of the first radio signal.

14. A radio station as claimed in claim 12, comprising means for transmitting the sounding radio signal, means for receiving reflections of the sounding radio signal, and means for deriving the sounding data from the received reflections of the sounding radio signal.

15. A radio station as claimed in claim 12, further comprising means for comparing the first and second sounding data and means for using both of the first and second sounding data to generate the model of the received first radio signal if the first and second sounding data are dissimilar according to a predetermined criterion and otherwise using one of the first and second sounding data to generate the model.

16. A method of characterising multipath propagation of a radio system comprising:

transmitting a sounding signal;

reflecting the sounding signal off reflecting surfaces in a local environment;

receiving the sounding signal;

correlating the sounding signal received in the receiving the sounding signal step with a replica of the sounding signal transmitted in the transmitting step to generate a first correlation;

sampling the first correlation a number of times;

processing the first correlation to generate a first correlation model;

scaling the first correlation model in time and amplitude to approximate a reflected signal which would be received via a non-reflected transmission to generate a scaled model;

transmitting a ranging signal;

receiving the ranging signal;

correlating the ranging signal received in the receiving the ranging signal step with a replica of the ranging signal transmitted in the transmitting step to generate a second correlation;

evaluating a match between the second correlation and the scaled model;

exploiting at least one parameter value from the match.

17. The method of claim 16, wherein the step of scaling the first correlation model further comprises:

measuring the amplitude $a_{b_k}$, k=1,K of each of the K samples;

measuring the time delay $\tau_{b_k}$, k=1,K of each sample with respect to the transmitted first sounding signal;

generating a model of the received sounding signal correlation function $R_b(\tau)$ using the following expression:

$$R_b(\tau) = \sum_{k=1}^{K} a_{b_k} F_b\left(\frac{d_{b_r}}{c}\right)$$

where $d_{b_k} = c \cdot \tau_{d_k}$, c is the speed of light, and $F_b(\tau)$ is the ideal correlation function of the sounding signal received via a single path with delay τ and normalised to have a peak amplitude of unity.

18. The method of claim 17, wherein the generating step further comprises replacing each $d_{b_k}$ by the distance $d_k$ traveled if the signal contributing to that sample had traveled from a target station via the same reflecting surface.

19. The method of claim 16, wherein the correlating the ranging signal step further comprises a direct path component and the scaled model of the sounding signal correlation function, as follow:

$$R(\tau) = a_0 e^{j\theta_0} F\left(\frac{d_0}{c}\right) + R_{b_{scaled}}(\tau)$$

where $a_0$, $d_0$, and $\theta_0$ are respectively a direct path received amplitude, path length and phase, and F is the ideal correlation function of the ranging signal received via a single path with delay τ and normalized to have a peak amplitude of unity.

* * * * *